US012240662B1

(12) United States Patent
Welschoff

(10) Patent No.: US 12,240,662 B1
(45) Date of Patent: Mar. 4, 2025

(54) NESTABLE PAINT CAN BUCKET WITH DOUBLE TAMPER EVIDENT LOCKING SYSTEM

(71) Applicant: Heinz Welschoff, Fort Lauderdale, FL (US)

(72) Inventor: Heinz Welschoff, Fort Lauderdale, FL (US)

( * ) Notice: Subject to any disclaimer, the term of this patent is extended or adjusted under 35 U.S.C. 154(b) by 0 days.

(21) Appl. No.: 18/663,334

(22) Filed: May 14, 2024

(51) Int. Cl.

| | |
|---|---|
| ***B65D 43/02*** | (2006.01) |
| ***B44D 3/12*** | (2006.01) |
| ***B65D 1/16*** | (2006.01) |
| ***B65D 21/02*** | (2006.01) |
| ***B65D 25/32*** | (2006.01) |
| ***B65D 41/34*** | (2006.01) |
| ***B65D 47/12*** | (2006.01) |
| ***B65D 51/18*** | (2006.01) |
| ***B65D 51/24*** | (2006.01) |

(52) U.S. Cl.
CPC ......... *B65D 43/0283* (2013.01); *B44D 3/127* (2013.01); *B65D 1/16* (2013.01); *B65D 21/0222* (2013.01); *B65D 25/32* (2013.01); *B65D 41/3447* (2013.01); *B65D 47/123* (2013.01); *B65D 51/18* (2013.01); *B65D 51/242* (2013.01); *B65D 2251/0025* (2013.01); *B65D 2251/0081* (2013.01); *B65D 2543/00092* (2013.01); *B65D 2543/00296* (2013.01); *B65D 2543/00527* (2013.01); *B65D 2543/00537* (2013.01)

(58) Field of Classification Search
CPC .. B65D 43/0283; B65D 1/16; B65D 21/0222; B65D 25/32; B65D 41/3447; B65D 47/123; B65D 51/18; B65D 51/242; B65D 2251/0025; B65D 2251/0081; B65D 2543/00092; B65D 2543/00296; B65D 2543/00527; B65D 2543/00537; B44D 3/127
See application file for complete search history.

(56) References Cited

U.S. PATENT DOCUMENTS 3,840,143 A * 10/1974 Davis ................ B65D 43/0231 206/520
4,548,332 A * 10/1985 Neat ...................... B65D 41/34 220/268
4,655,363 A * 4/1987 Neat ...................... B65D 41/34 220/268

(Continued)

*Primary Examiner* — Frederick C Nicolas
(74) *Attorney, Agent, or Firm* — Melvin K. Silverman

(57) ABSTRACT

A tamper-resistant, refillable paint container featuring a double tamper-evident A locking system. The container includes an inverted frustum conical liquid receptacle with external threading and male locks. A tamper-resistant lid with internal threading, a first tamper-evident locking ring with internal female ratchet locks, and break-off fingers engages the receptacle. A hollow neck extends from the lid, with external threading and male locks. A cap with internal threading, a second tamper-evident locking ring with internal female locks, and break-off fingers engages the hollow neck. The cap is installed onto the lid prior to filling, and the lid with the locked cap is secured onto the receptacle after filling. Removal of the cap or lid causes the break-off fingers to detach, providing tamper evidence. The container enhances user convenience, reduces spills, and provides cost savings through efficient nesting during shipping and storage.

5 Claims, 20 Drawing Sheets

(56) References Cited

U.S. PATENT DOCUMENTS

| | | | | | |
|---|---|---|---|---|---|
| 4,961,512 | A * | 10/1990 | Von Holdt | B65D 21/0219 | 220/276 |
| 5,170,905 | A * | 12/1992 | Luch | B65D 43/0206 | 220/276 |
| 5,873,484 | A * | 2/1999 | Clute | B65D 43/0256 | 220/276 |
| 5,875,913 | A * | 3/1999 | Letica | B65D 25/32 | 220/756 |
| 5,931,332 | A * | 8/1999 | Mygatt | C12N 9/1205 | 220/793 |
| 7,857,154 | B2 * | 12/2010 | Pedlar | B01L 3/50825 | 220/276 |
| 2007/0023299 | A1 * | 2/2007 | Clarkson | B65D 51/2835 | 206/219 |
| 2007/0164025 | A1 * | 7/2007 | McCandlish | A47G 19/2272 | 220/780 |
| 2008/0308554 | A1 * | 12/2008 | Farrar | B65D 47/122 | 220/281 |
| 2010/0187247 | A1 * | 7/2010 | Ziegler | B65D 43/0208 | 220/737 |
| 2013/0320018 | A1 * | 12/2013 | Crosby | B65D 43/0212 | 220/345.3 |
| 2019/0359380 | A1 * | 11/2019 | Welschoff | B65D 21/04 | |

* cited by examiner

NESTABLE PAINT CAN BUCKET WITH DOUBLE TAMPER EVIDENT LOCKING SYSTEM

FIELD OF THE INVENTION

The present invention relates to resealable tamper resistant liquid containers, specifically paint cans.

BACKGROUND

Current paint containers include metal cans with friction-fit lids or plastic buckets with snap-on lids. These containers typically have cylindrical sidewalls, which make them difficult to nest or stack efficiently, resulting in increased storage and transportation costs, particularly when empty. Typically, these containers are filled with paint by the manufacturer, sealed, and then shipped to retailers or consumers. However, these containers often lack adequate tamper-evident features, making it difficult to determine if the container has been opened or the contents have been altered. Additionally, once the paint is used, the containers are often discarded, leading to waste and environmental concerns.

Thus, a need exists in the market for a refillable paint container with improved tamper-evident features and a design that facilitates recycling and reuse. The present invention addresses these needs by providing a nestable plastic paint container with a double tamper-evident locking system for both the lid and the cap, as well as a design that allows for easy recycling of the tamper-evident components. The container also includes a flexible handle and a pouring spout orientation that enhances user convenience and reduces the likelihood of spills. Furthermore, the nestable design of the containers provides cost savings in shipping and storage.

SUMMARY OF THE INVENTION

The invention disclosed herein provides a refillable paint can, comprising an inverted frustum conical liquid receptacle defined by a lower floor with sidewalls that taper down from an open upper area to said lower floor, external outward threading at an upper outer boundary of said inverted frustum conical liquid receptacle, a plurality of male locks disposed below the external outward threading, and a tamper-resistant lid.

The invention disclosed herein also provides a tamper-resistant closure system for a container, comprising a lid having internal threads and a first tamper-evident locking ring with a plurality of internal female ratchet locks, wherein the internal threads of the lid are configured to engage with external threads of the container and the internal female ratchet locks are configured to engage with male locks of the container when the lid is locked onto the container, allowing the lid to be tightened, locked, and sealed, a plurality of break-off fingers disposed on the lid between the first tamper-evident locking ring and a top portion of the lid, a hollow neck extending from the lid, the hollow neck having external threads and a plurality of male locks, a cap having internal threads and a second tamper-evident locking ring with a plurality of internal female ratchet locks, wherein the internal threads of the cap are configured to engage with the external threads of the hollow neck and the internal female ratchet locks of the cap are configured to engage with the male locks of the hollow neck when the cap is locked onto the hollow neck, allowing the cap to be tightened, locked, and sealed, and a plurality of break-off fingers disposed on the cap between the second tamper-evident locking ring and a top portion of the cap, wherein the cap is installed, locked, and sealed onto the lid prior to filling the container, and the lid with the locked cap is configured to be secured onto the container after filling, activating the first tamper-evident locking ring and sealing the lid to the container, and wherein removal of the cap or the lid causes the respective break-off fingers to break off, providing tamper evidence and allowing for easy recycling of the tamper-evident locking rings.

It is an object of the present invention to provide a system that is easily nestable during shipping and transport to minimize the space needed to ship high volumes of paint cans.

It is yet another object of the present invention is to provide a lid that is tamper evident to allow the paint can to be filled and sealed, but provide evidence once a user opens the paint can for use.

It is a further object to provide a versatile, simple, and scalable solution that is easy for workers to use and implement at the end of the supply chain.

The drawings and specific descriptions of the drawings, as well as any specific or alternative embodiments discussed, are intended to be read in conjunction with the entirety of this disclosure. The invention may be embodied in many different forms and should not be construed as being limited to the embodiments set forth herein; rather, these embodiments are provided by way of illustration only and so that this disclosure will be thorough, complete, and fully convey understanding to those skilled in the art. The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1:
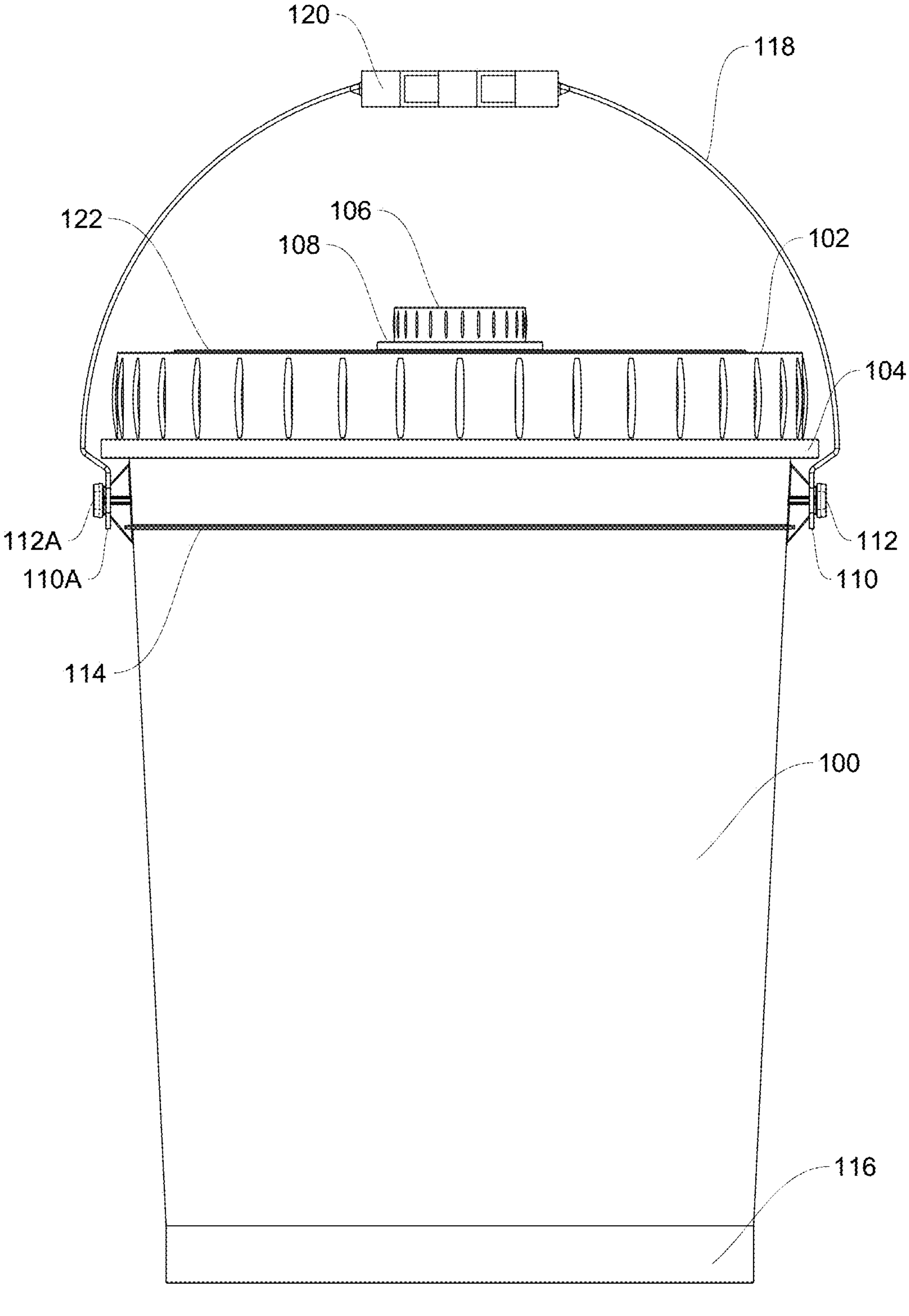
FIG. 1 illustrates a front view of an assembled nestable paint can with a flexible plastic lift handle in a vertical, locked position and left and right-side hooks. The tamper-evident threaded cover includes a tamper-evident threaded cap. The bottom floor of the can features a 360-degree recessed groove surrounding a central 360-degree floor.

The invention herein provides a solution for the lack of tamper-evident features, recyclability issues, difficulties faced by paint store employees when closing containers, and inefficient shipping geometry associated with current paint containers. The invention includes a uniquely configured tamper-resistant cap and lid capable of solving the above issues.

Current paint containers include metal cans with friction-fit lids or plastic buckets with snap-on lids. These containers typically have cylindrical sidewalls, which make them difficult to nest or stack efficiently, resulting in increased storage and transportation costs, particularly when empty. Typically, these containers are filled with paint by the manufacturer, sealed, and then shipped to retailers or consumers. However, these containers often lack adequate tamper-evident features, making it difficult to determine if the container has been opened or the contents have been altered. Additionally, once the paint is used, the containers are often discarded, leading to waste and environmental concerns.

The current invention solves these problems by providing a uniquely configured tamper-resistant cap and lid. The invention applies to any size nestable plastic buckets. The invention provides a double tamper evident ratchets locking systems, four male locks on the outside near the top of the bucket and under the external threads. The cover has internal threads and a horizontal tamper evident locking ring. The horizontal tamper evident locking ring has internal female ratchet locks. The drawings show four separate rachet locks. They cover the four male locks on the outside, near the top of the bucket, and under the external threads. When the cover is locked to the bucket the internal female ratchet locks allow the cover to be tightened, locked as needed, and sealed on top of the bucket. Outside of the cover, and in between the horizontal tamper evident locking ring, multiple horizontal break-off fingers exist. The cover has a hollow neck with four male locks and external threads. The cap has internal threads and a horizontal tamper evident locking ring. The horizontal tamper evident locking ring has internal female ratchet locks. The drawings show four separate rachet locks. They cover the four male locks on the outside of the threaded neck, and under, when the cap is locked to the threaded neck. The internal female ratchet locks allow the cap to be tightened as needed, locked, and sealed on top of the threaded neck of the cover. Outside of the cap, and in between of the horizontal tamper evident locking ring, have multiple horizontal break-off fingers.

The inventive cap herein discloses a tamper evident ring, similar to that found on bottles with breakable tabs. When turning the cap on a bottle neck, the tamper evident ring lifts up over the external bottle threads. When the cap on a typical bottle is tight, the tamper evident ring is below the neck threading. When unscrewing the cap of these bottles, the tamper evident ring starts to lift up until it stops under the threading. When continuing to turn the cap of current bottles, the tamper evident ring breaks off under the lower threads. This also creates an issue when recycling because the ring of current bottles does not come off. The difference with the tamper evident ring herein and tamper evident rings of current bottles available is the ability to remove for recycling, and the rachet/lock mechanism. When the cap/cover of this invention is tightened for the first time, the temper evident ring locks onto the male lock elements on the can (and for the cap, the locking protrusions on the cover). By turning the cap/cover of this invention, the locks/rachet combination keeps the ring in place, which allows the fingers to break. The cover keeps the ring on tight, but when removed, the ring can then be removed, unlike bottles currently available.

After the paint can has been filled with the desired paint color, the employee screws the cap back onto the cover neck to seal it. Once the paint has been mixed by shaking, the employee transfers the paint can to the consumer without reopening the cap, as the color can be seen through the clear cap. When the consumer has almost used up the paint, they turn the cover counterclockwise from the can body, causing the tamper-evident locking ring to break off from the lower part of the cover. Once the cover has been removed from the can body, the tamper-evident ring can easily be removed and recycled.

Problems with existing tamper-evident bottles and caps arise when turning the cap on the bottle neck. Initially, the cap turns and then lifts the tamper-evident ring upwards, pushing it under the threading before breaking off from the lower part of the cap. When the cap has been removed, the ring remains stuck on the bottle neck and cannot be easily removed without cutting it. This creates a recycling problem due to the presence of different types of plastic materials.

The instant invention addresses these issues by saving time, reducing strenuous hand labor, eliminating the need for tools, and lowering the risk of injury. This innovative solution is cleaner, quieter, more convenient, reusable, and recyclable. Additionally, the high-volume nestability of the cans provides savings in shipping costs from the can manufacturer to the paint manufacturer.

The nestable paint can bucket with double tamper evident locking system of the present invention may be used to provide a system that is easily nestable during shipping and transport to minimize the space needed to ship high volumes of paint cans, to provide a lid that is tamper evident to allow the paint can to be filled and sealed, but provide evidence once a user opens the paint can for use, and to provide a versatile, simple, and scalable solution that is easy for workers to use and implement at the end of the supply chain. This apparatus and system are particularly shown in FIGS. 1-10.

FIG. 1 illustrates a complete vertical front view of the can bucket 100, with the cover 102, lock ring 104, a can bucket support wall 122, assembled cap 106, with the lock ring 108, two side lift handle hooks 112/112A, below the two-side lift handle supports are the lift handle connection 110/110A, these are connected on both sides to the lift handle hooks 112/112A, a bucket stop ring 114, on can bucket 100, a lower support wall 116, a vertical lift handle 118, including a larger round grip handle 120.

Figure 1A:
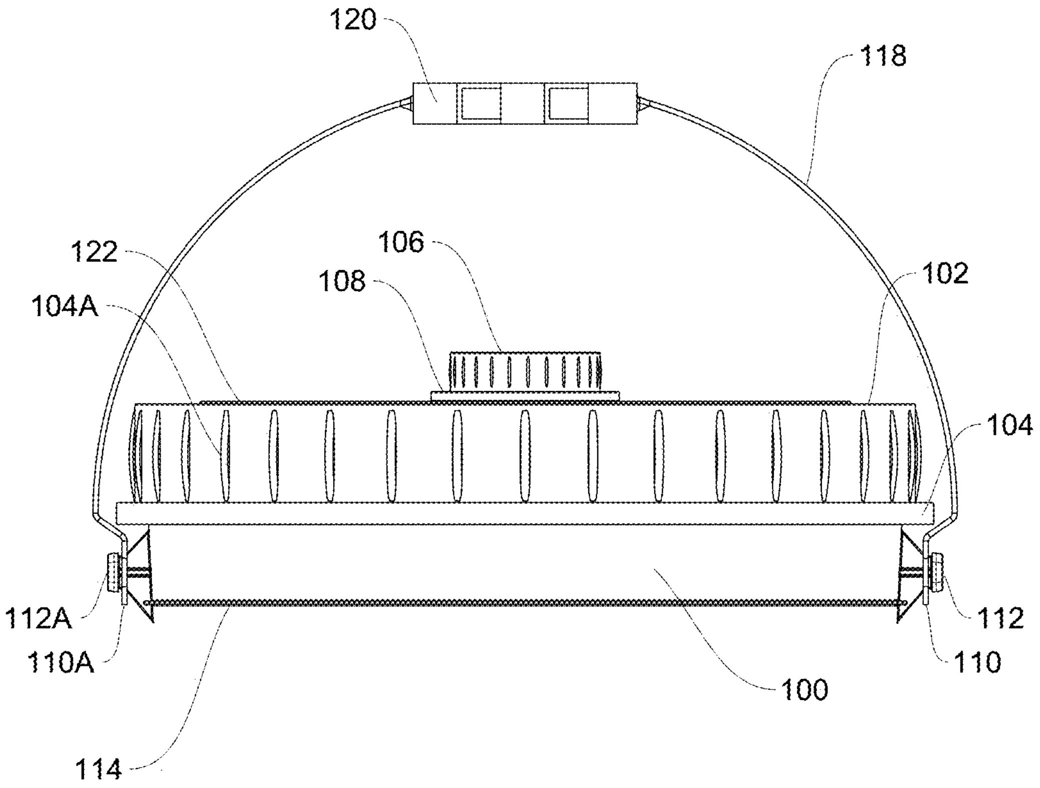
FIG. 1A illustrates a front isolated view of the top of the assembled nestable paint can with the flexible plastic lift handle shown.

FIG. 1A illustrates a complete vertical larger upper front view of the can bucket 100, with the cover 102, a can bucket support wall 122, tamper evident lock ring 104, an assembled cap 106, with the lock ring 108, two side lift handle hooks 112/112A, below the two-side lift handle supports are the lift handle connection 110, 110A, these are connected on both sides to the lift handle hooks 112/112A, a bucket stop ring 114, on can bucket 100, a vertical lift handle 118, including a larger round grip handle 120.

Figure 2:
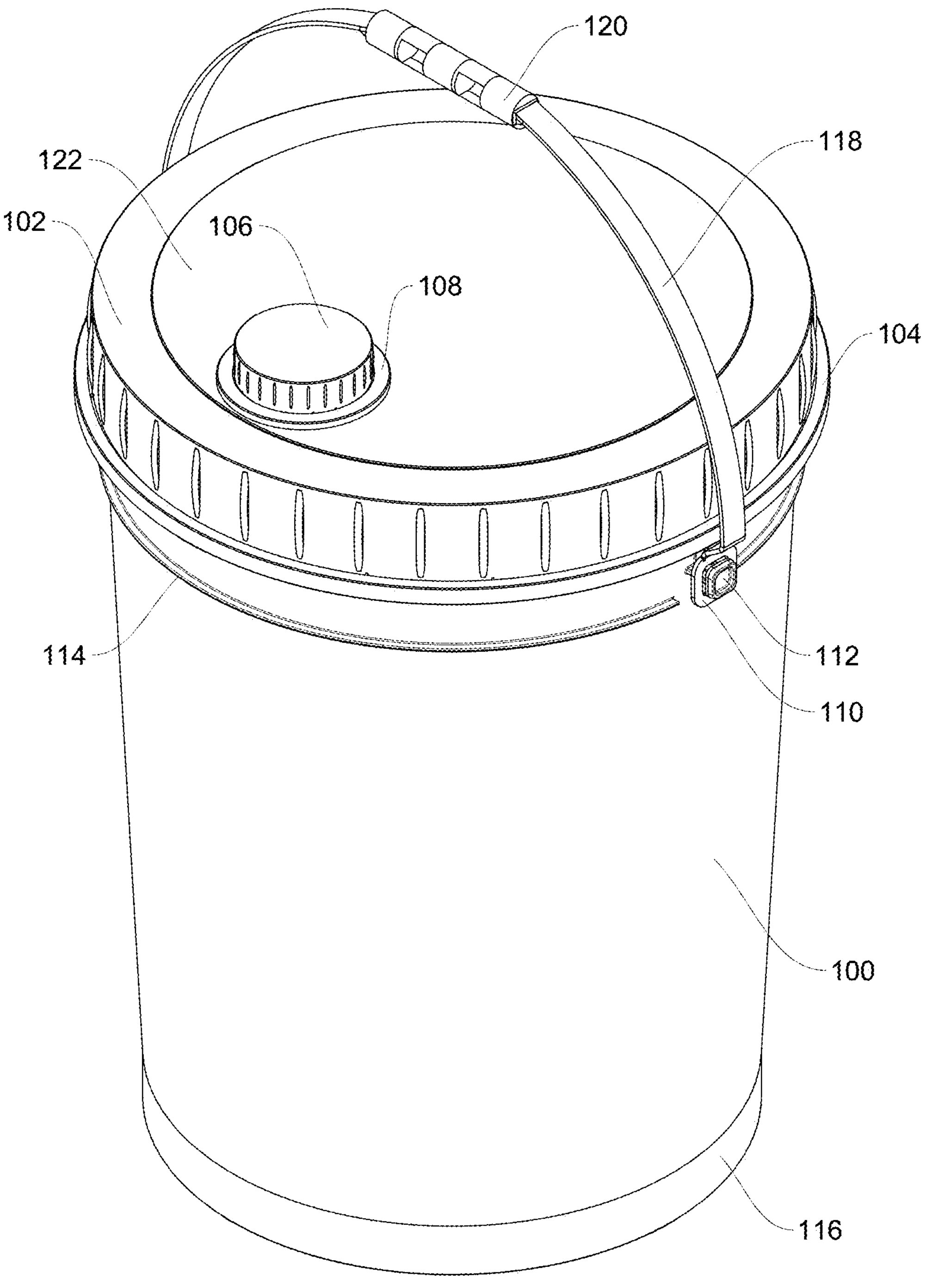
FIG. 2 illustrates a top view of an assembled nestable paint can with the cap, cover, and their respective lock rings. The flexible plastic lift handle is in a side vertical upright position, connected to the right-side hook. The bottom of the can shows a hollow support resting wall.

FIG. 2 illustrates a complete vertical front and side view of the can bucket 100, with the cover 102, a can bucket support wall 122, tamper evident lock ring 104, a assembled cap 106, with the lock ring 108, one side lift handle hooks 112, below the one side lift handle support is the lift handle connection 110, and connected one side to the lift handle hook, 112, a bucket stop ring 114, on can bucket 100, a lower support wall 116, a vertical lift handle 118, including a larger round grip handle 120.

Figure 3:
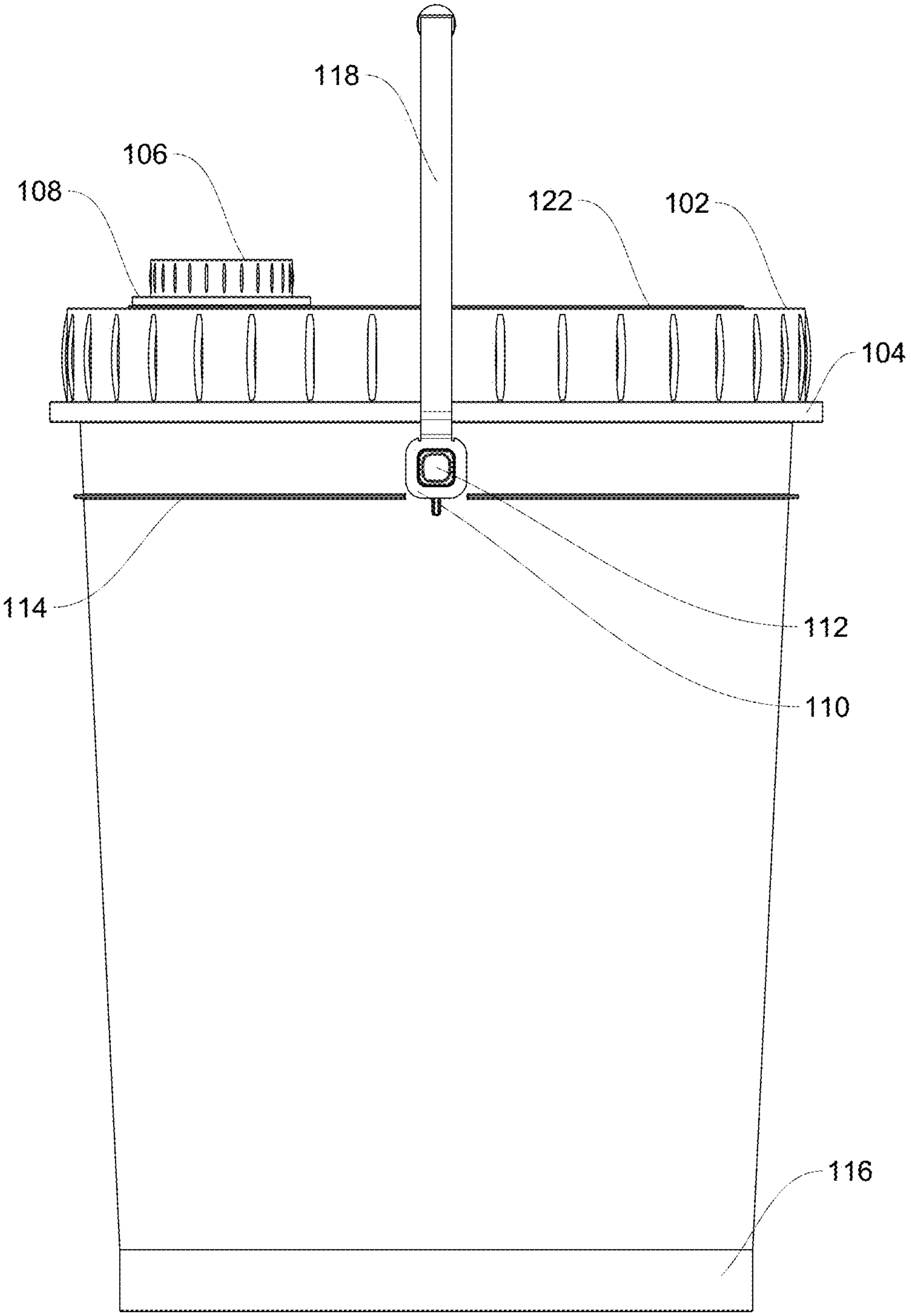
FIG. 3 illustrates a side view of the nestable paint can with the flexible plastic handle in an upright position and the cap attached. The flexible plastic lift handle is connected to both hooks.

FIG. 3 illustrates a complete vertical side view of the can bucket 100, with the cover 102, a can bucket support wall 122, tamper evident lock ring 104, an assembled cap 106, with the lock ring 108, one side lift handle hooks 112, below the one side lift handle support is the lift handle connection 110, and connected one side to the lift handle hook, 112, a bucket stop ring 114, on can bucket 100, a lower support wall 116, and a vertical lift handle 118.

Figure 4:
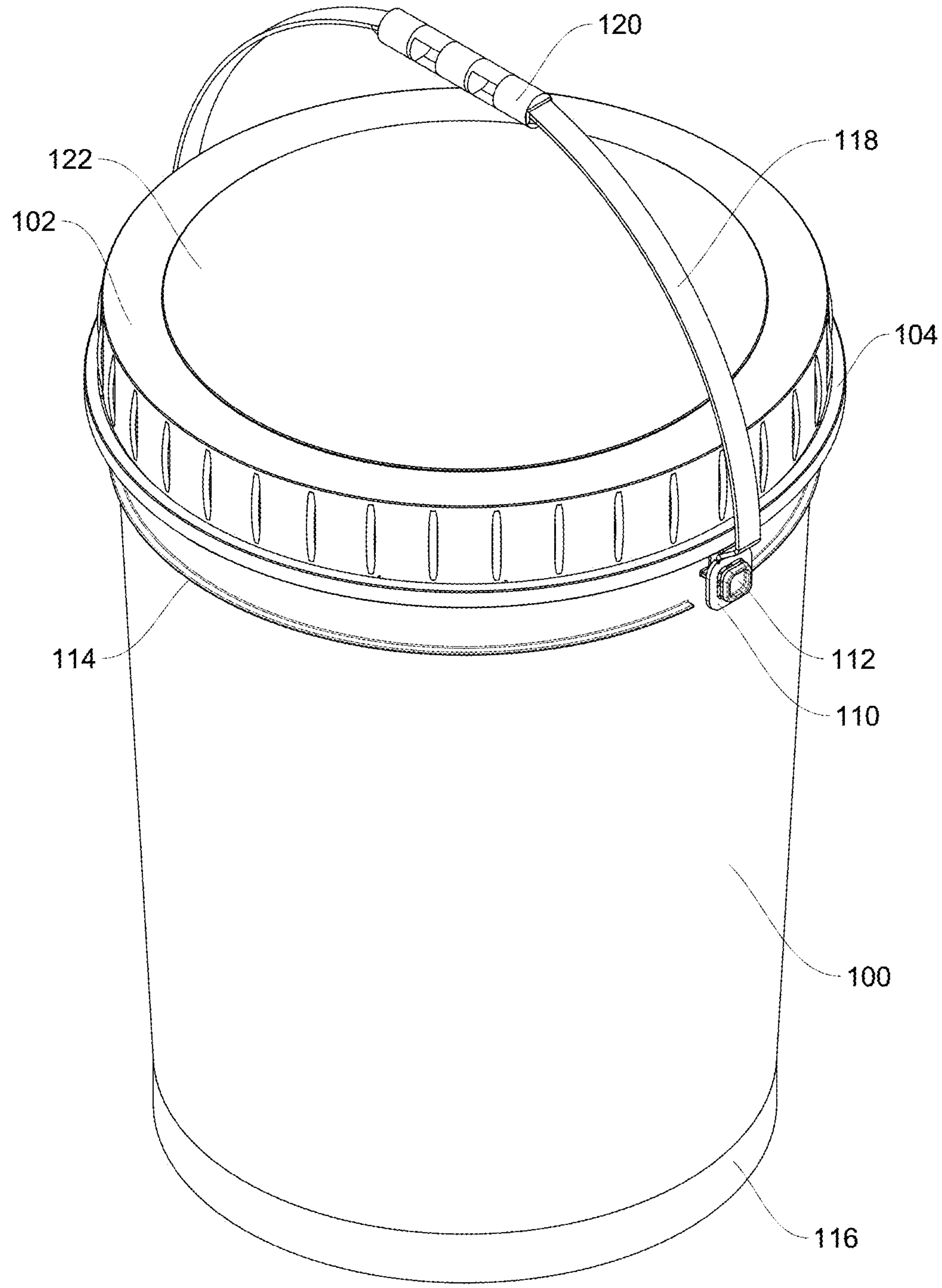
FIG. 4 illustrates a top view of the nestable paint can with a flat cover and the flexible plastic lift handle in an upward, locked position, secured by the two hooks.

FIG. 4 illustrates a complete vertical front and side view of the can bucket 100, with the cover 102, a can bucket support wall 122, tamper evident lock ring 104, one side lift handle hooks 112, below the one side lift handle hooks 112, is the lift handle connection 110, and connected one side to the lift handle hook 112, a bucket stop ring 114, on can bucket 100, a lower support wall 116, a vertical lift handle 118, including a larger round grip handle 120.

Figure 5:
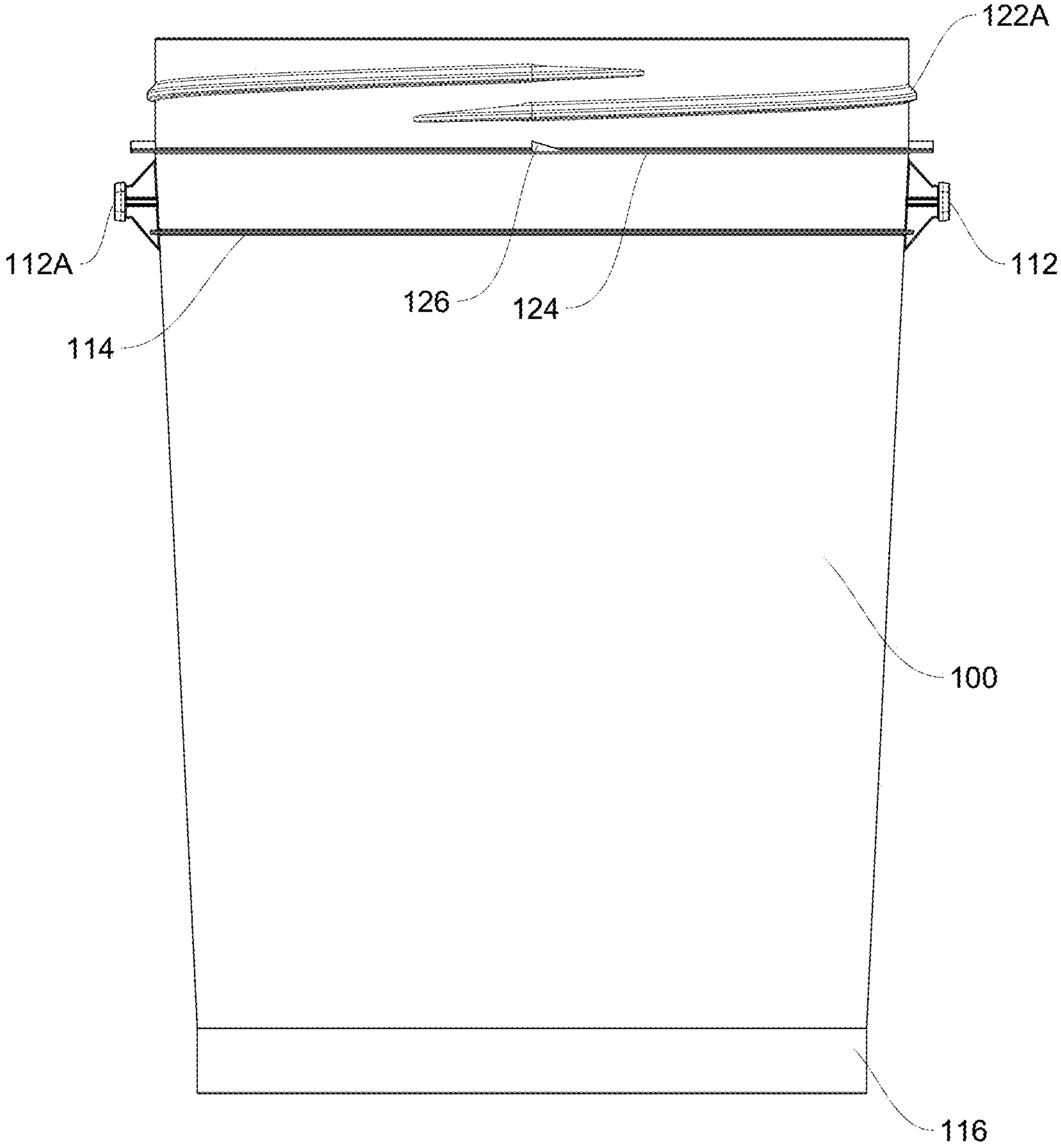
FIG. 5 illustrates a front view of the nestable paint can, showing the upper threads, support ring with male locks, and the two side hooks.

FIG. 5 illustrates a complete vertical front view of can bucket 100, below the one side lift handle hooks 112-112A and two square locks 112, top external threading 122A, support ring 124, with male locks 126, and a lower can bucket support wall 116.

Figure 5A:
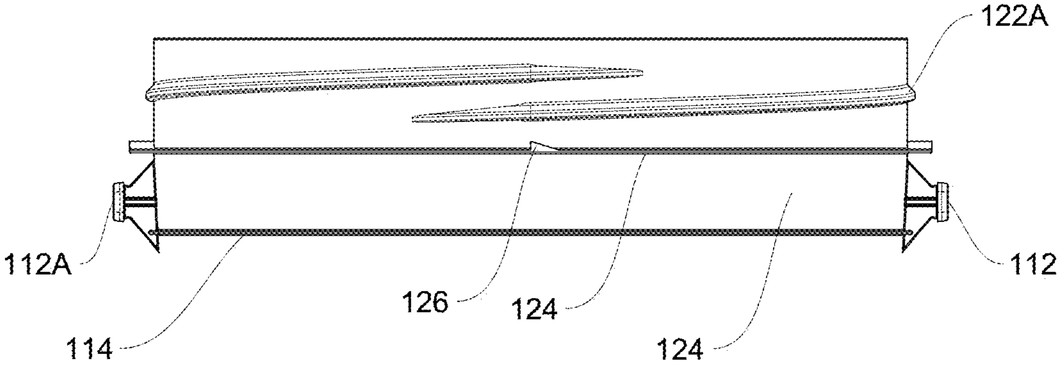
FIG. 5A illustrates an enlarged front view of the upper portion of the nestable paint can, detailing the upper threads, support ring with male locks, and the two side hooks.

FIG. 5A illustrates a complete horizontal larger upper front view of can bucket 100, below the one side lift handle hooks 112-112A and two square locks 112 112A, top external threading 122A, support ring 124, with male locks 126.

Figure 6:
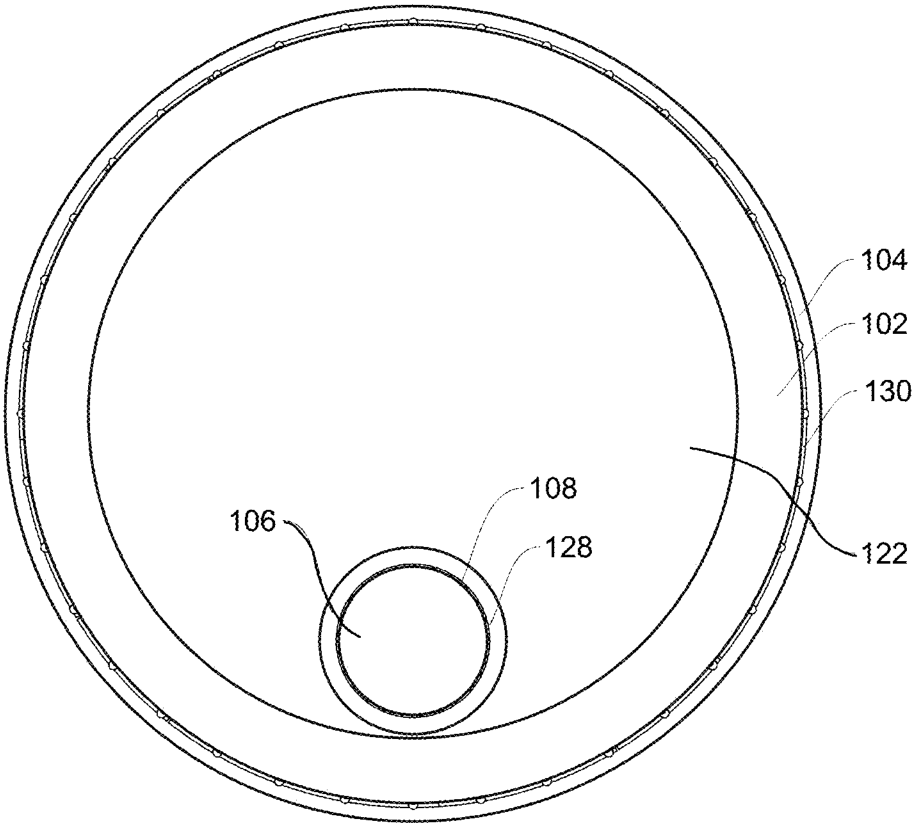
FIG. 6 illustrates a top view of the cover and cap with their respective tamper-evident lock rings and break-off fingers.

FIG. 6 illustrates a complete top view of cover 102, a can bucket support wall 122, tamper evident break-off fingers 130, complete top view of cap 106, tamper evident locking ring 108, cap tamper evident break off-fingers 128.

Figure 6A:
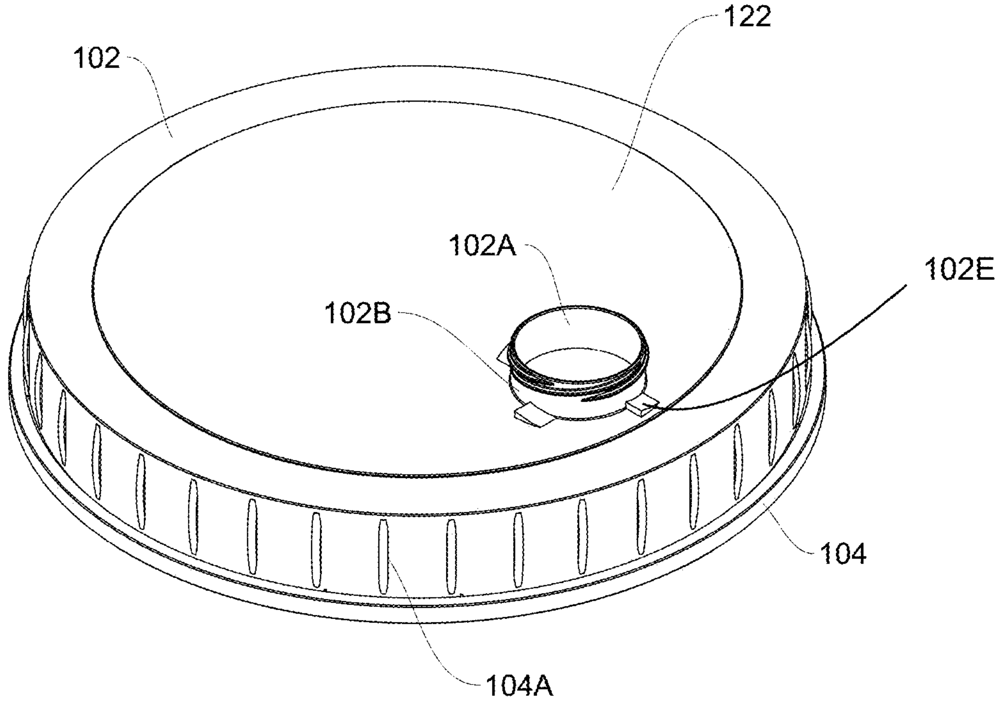
FIG. 6A illustrates a top view of the cover, featuring a hollow threaded neck, male locks, and a recessed outer groove.

FIG. 6A illustrates a complete top view of cover 102, a hollow neck 102A, with exterior threads 102B, exterior locks 102E, are attached to the cover 102, tamper evident locking ring 104, grips 104A, and support wall 122.

Figure 6B:
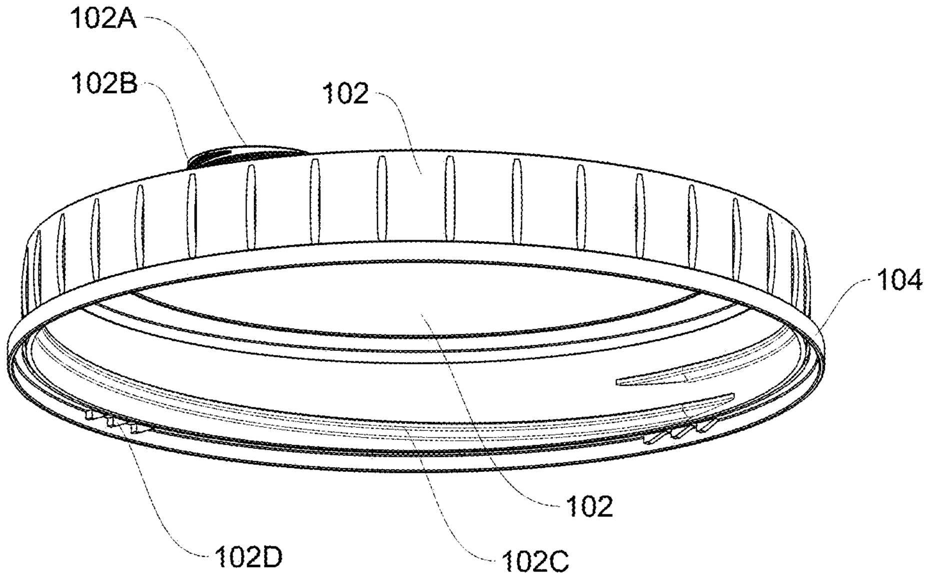
FIG. 6B illustrates a cross-sectional view of the cover, showing the threaded hollow neck, an outside view with the tamper-evident ring, an inner view with threads, and female locks.

FIG. 6B illustrates a horizontal view of the cover 102, threaded hollow neck 102A, with exterior threads 102B, an outside site view with the tamper evident ring 104, an inner view with threads 102C, and female locks 102D.

Figure 6C:
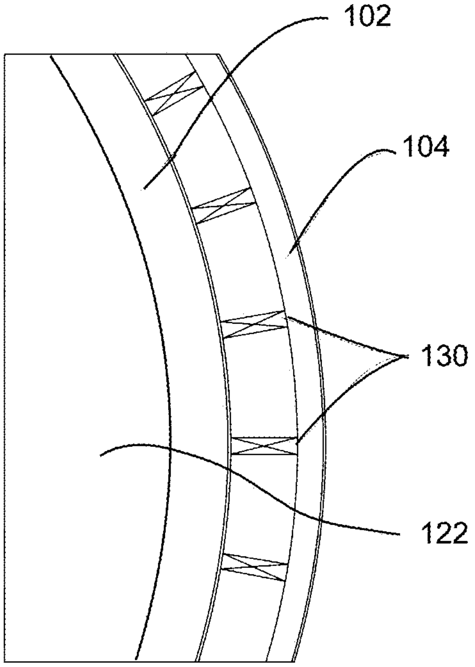
FIG. 6C illustrates an enlarged top cutaway view of the cover, detailing the large break-off fingers and the tamper-evident ring.

FIG. 6C illustrates a partially larger top view of cover 102, tamper evident locking ring 104, tamper evident break-off fingers 130, a can bucket support wall 122.

Figure 6D:
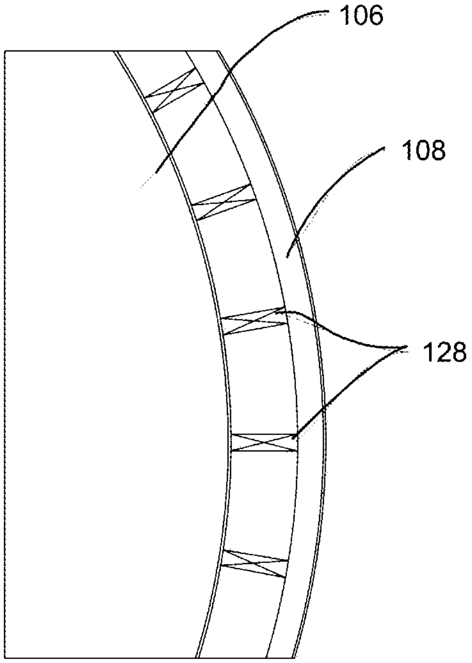
FIG. 6D illustrates an enlarged top cutaway view of the cap, detailing the large break-off fingers and the tamper-evident lock ring.

FIG. 6D illustrates a partially larger top view of cap 106, tamper evident locking ring 108, tamper evident break-off fingers 128.

Figure 6E:
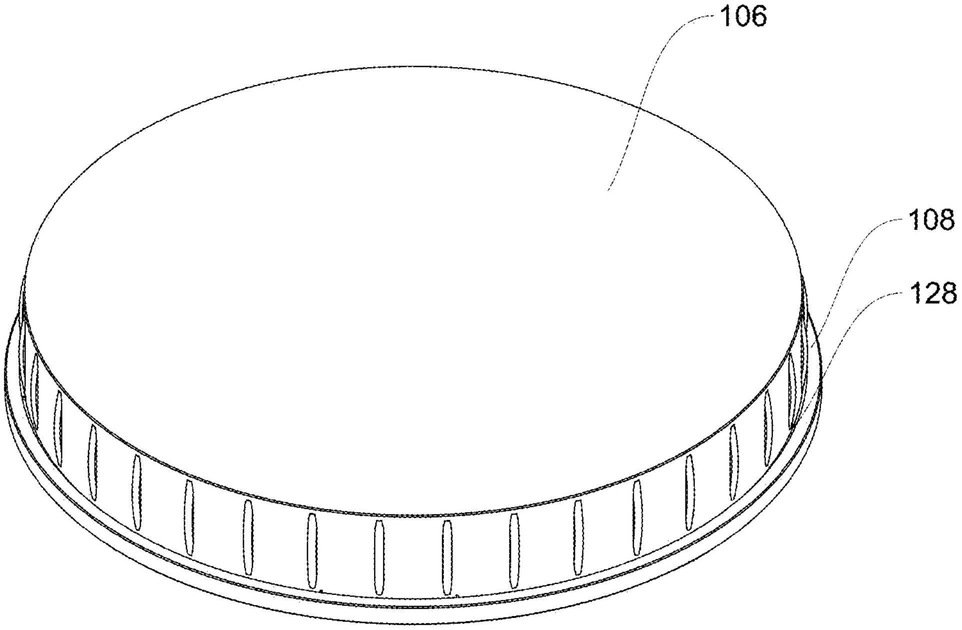
FIG. 6E illustrates an enlarged top cutaway view of the cap, showing the break-off fingers and the tamper-evident lock ring.

FIG. 6E illustrates a top view of cap 106, tamper evident locking ring 108, tamper evident break-off fingers 128.

Figure 6F:
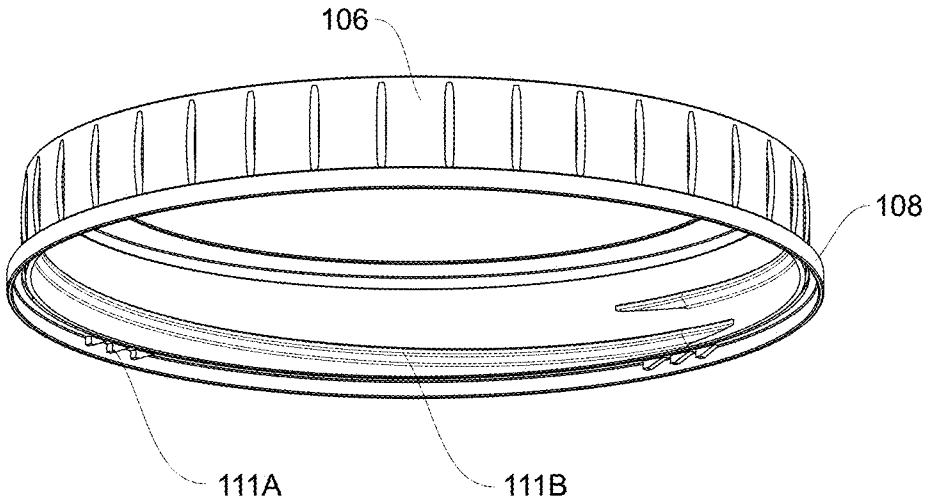
FIG. 6F illustrates a cross-sectional view of the cap, showing an outside view with the tamper-evident lock ring, an inner view with threads, and female locks.

FIG. 6F illustrates a horizontal view of the cap 106, tamper evident locking ring 108, an inner view with threads 111B, and female locks 111A.

Figure 7:
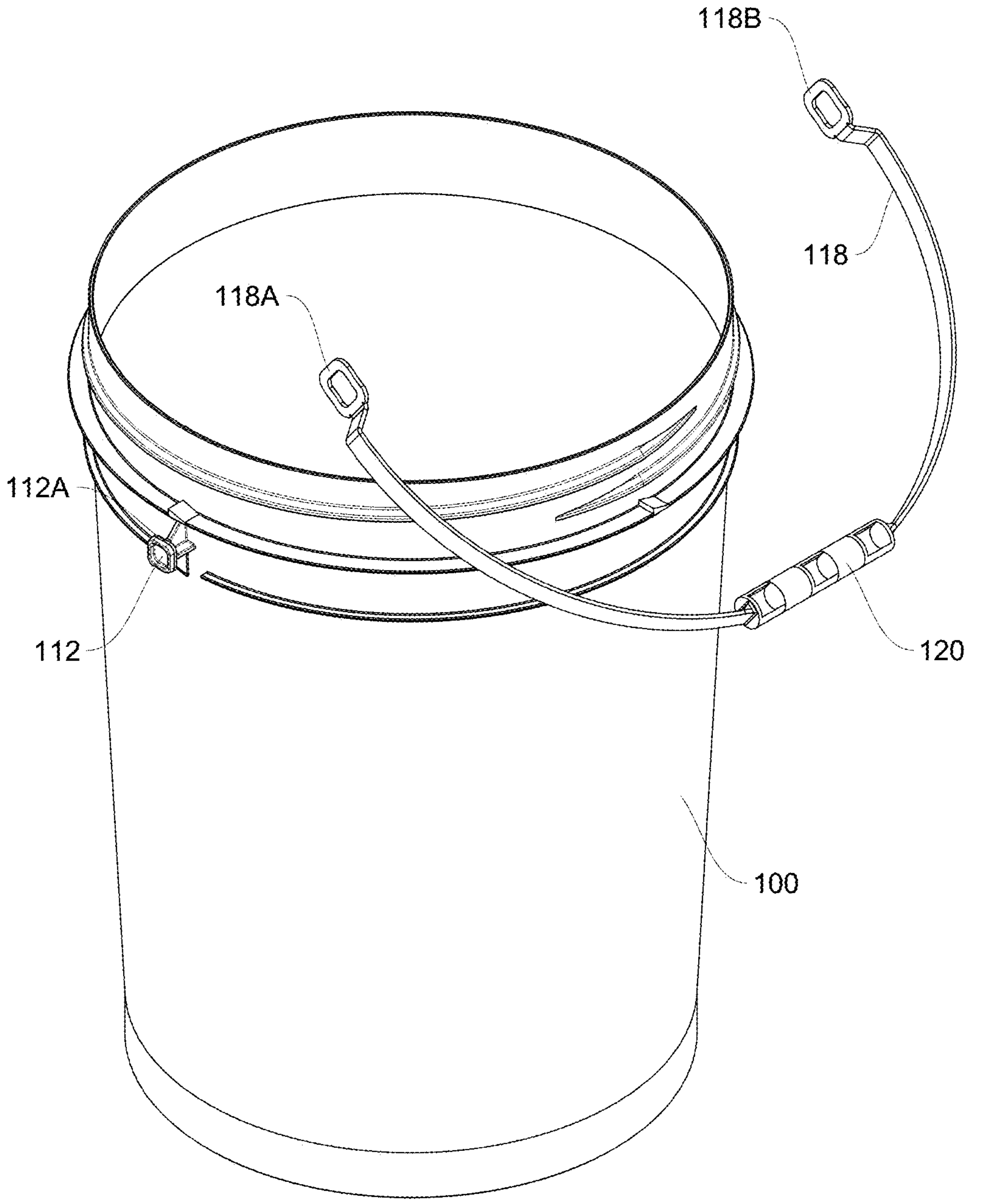
FIG. 7 illustrates a top view of the nestable paint can with the left-side hook and a horizontal view of the lift handle.

FIG. 7 illustrates a complete vertical front and left side view of can bucket 100, one square lock 112, lift handle 118, including a larger round grip handle 120, and two handle openings 118A/118B.

Figure 8:
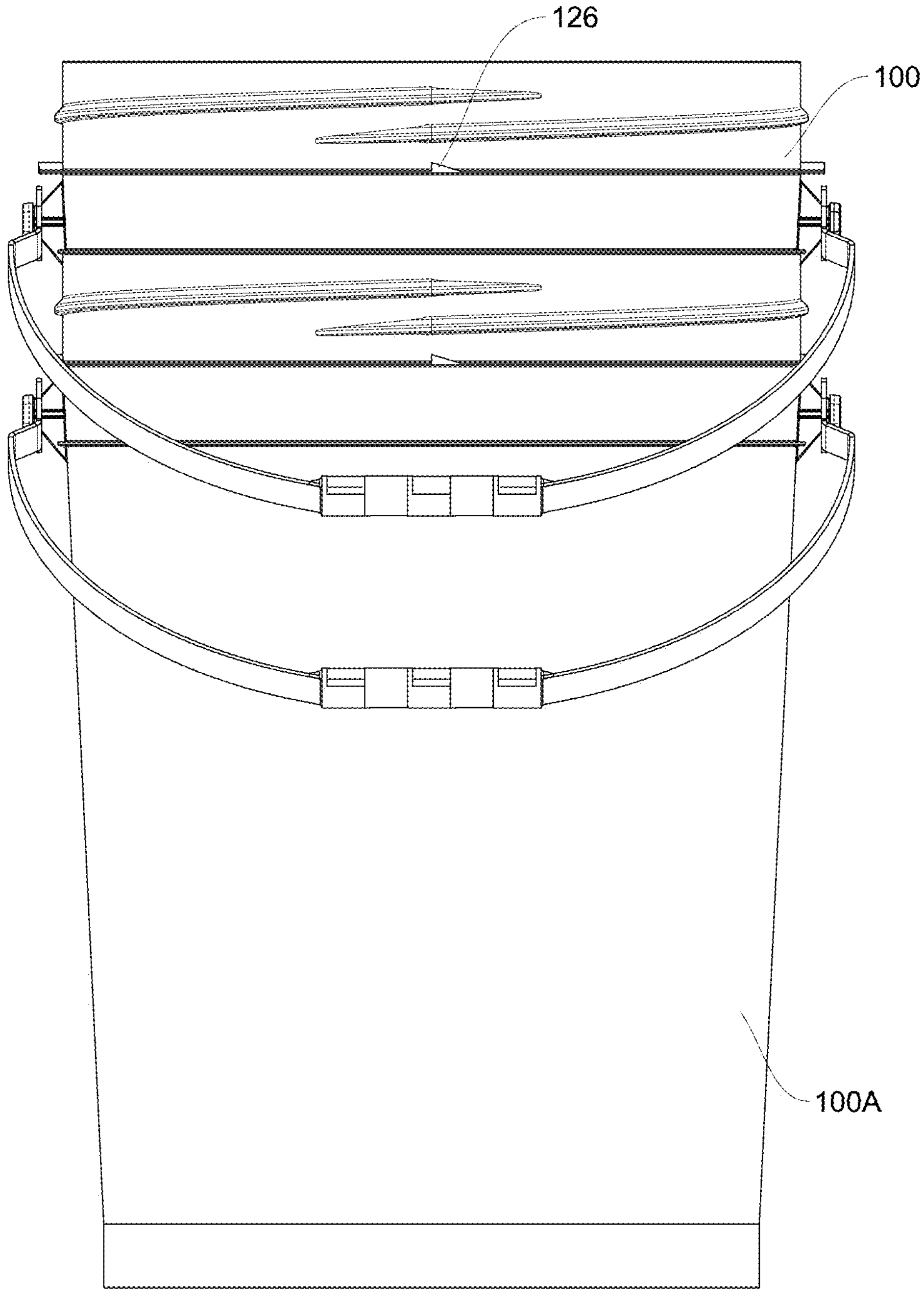
FIG. 8 illustrates a front view of two nestable paint cans in a nested position, with both lift handles in a downward position.

FIG. 8 illustrates a complete vertical front view of the upper can bucket 100, and the upper can bucket 100 is nested inside the lower can backed 100A. The figure also shows the male locks 126.

Figure 8A:
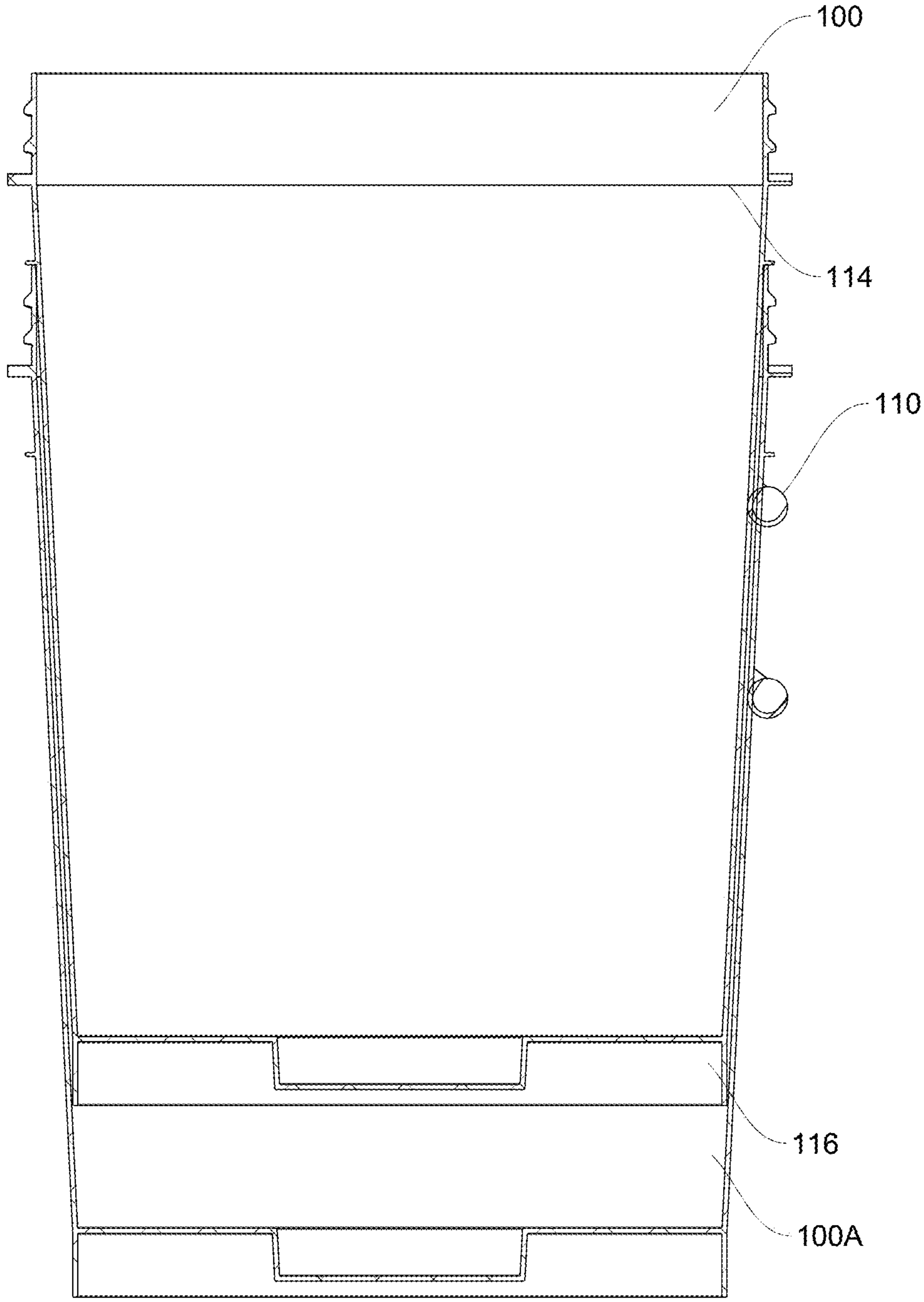
FIG. 8A illustrates a front cutaway view of two nestable paint cans in a nested position.

FIG. 8A illustrates a complete vertical front cut away view of the upper can bucket 100, whereas the upper can bucket 100, is nested inside the lower can bucket 100A. FIG. 8A also shows the stop ring 114, of the upper can bucket 100, and lower support wall 116.

Figure 9:
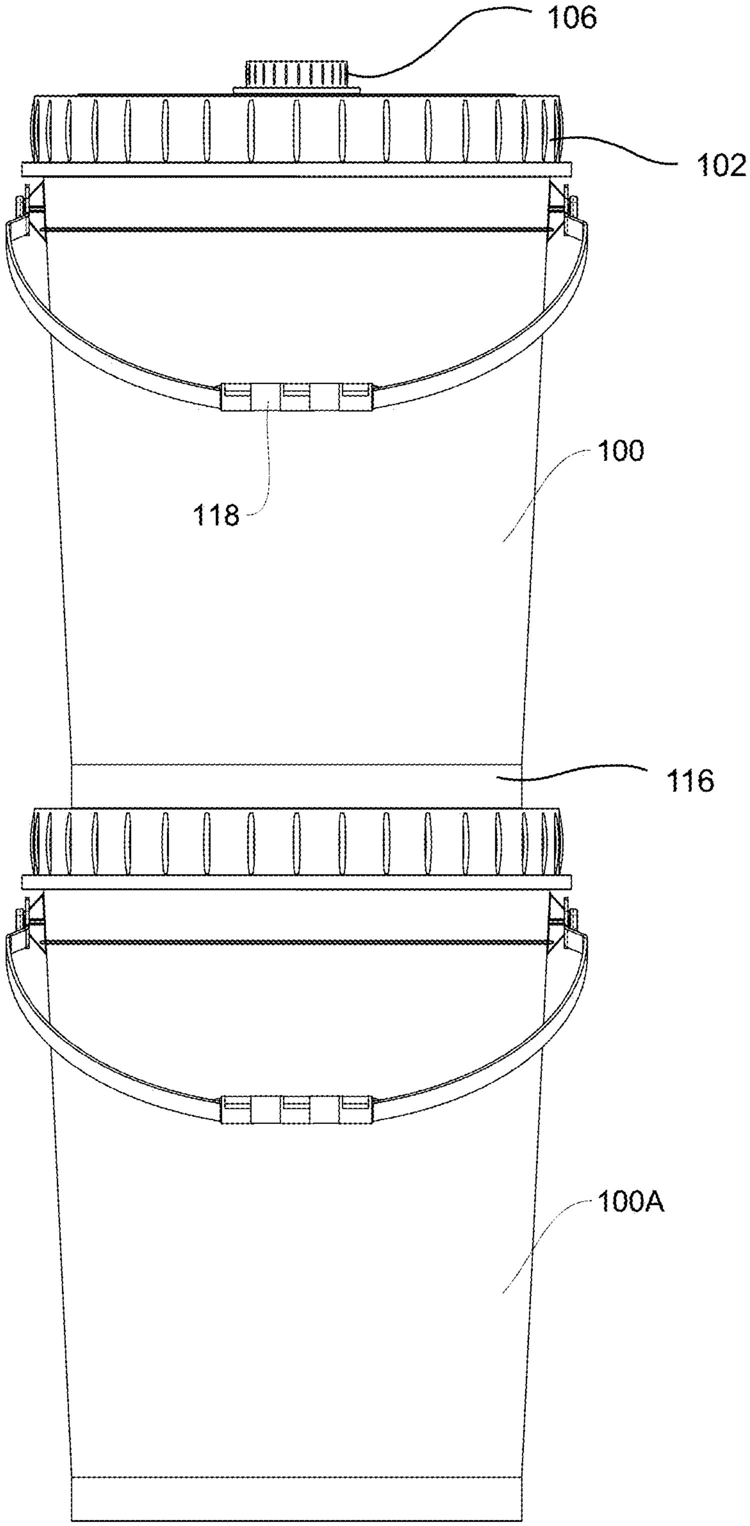
FIG. 9 illustrates a front view of two nestable paint cans in a stacked position, with both lift handles in a downward position.

FIG. 9 illustrates a complete vertical front view, whereas the top can bucket 100, is placed on top of the lower filled can bucket 100A. Also shown are the cover 102, cap 106, handles 118 in a downward position, and lower support wall 116.

Figure 9A:
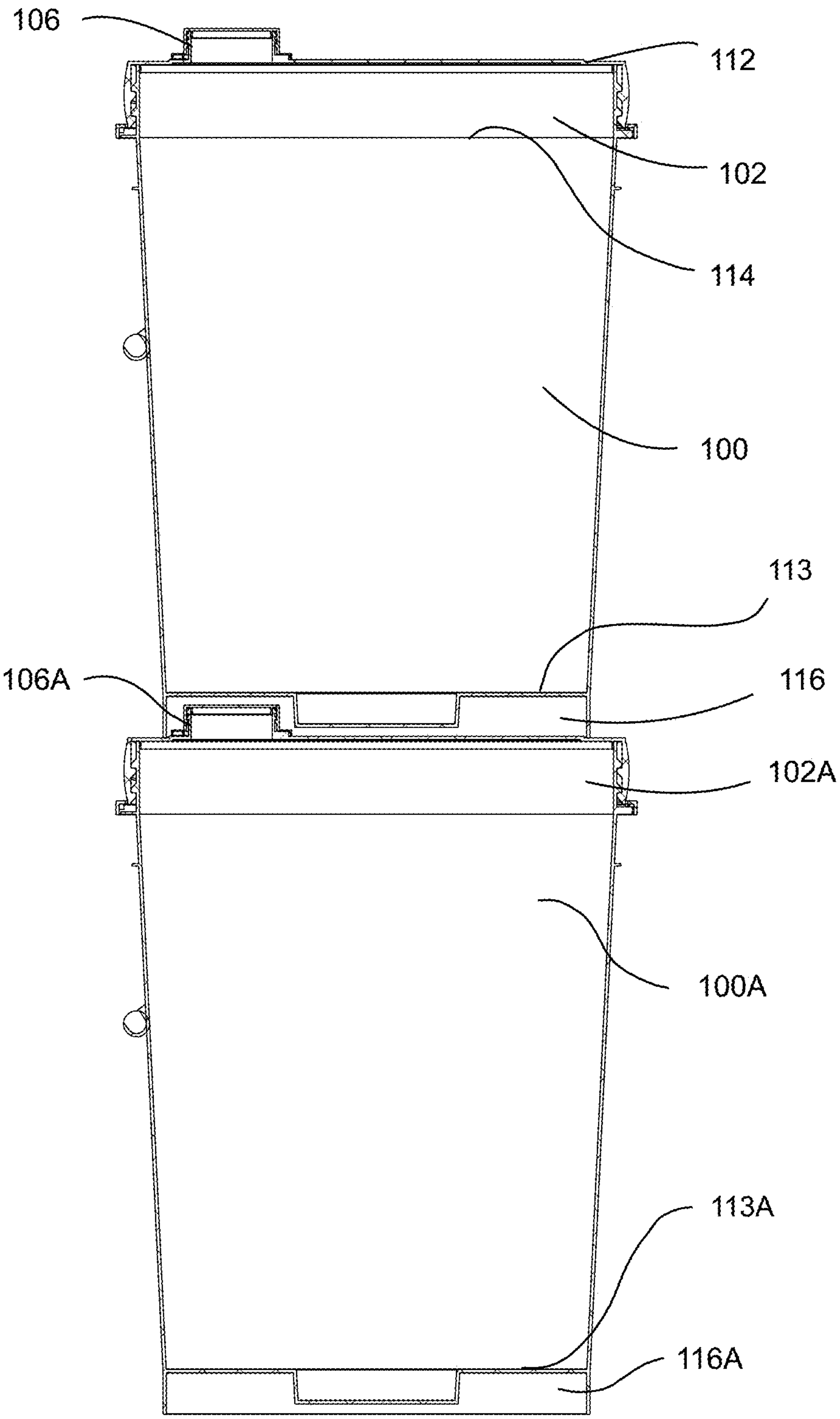
FIG. 9A illustrates a front cutaway view of two nestable paint cans in a stacked position, with the cap of the lower can positioned inside the 360-degree floor groove of the upper can.

FIG. 9A illustrates a complete vertical cut away front view, of the top can bucket 100, is placed on top of the lower cut away vertical can bucket 100A, it also shows a 360-degree recessed floor 113A at the bottom of the can bucket 100A, whereas the hollow threaded neck 102B, and cap 106A, of the bottom can bucket 100A are below the 360-degree recessed floor 113 in the lower area defined by the hollow wall 116 of the upper can bucket 100. FIG. 9A also shows the stop ring 114 on the upper bucket. The lower bucket 110A also has a lower area defined by the hollow wall 116A.

Figure 10A:
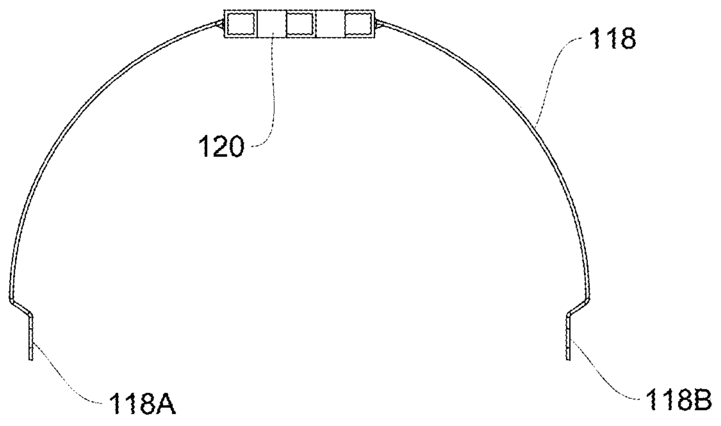
FIGS. 10A-10C illustrates a front view, side view, and flat view of the flexible plastic lift handle.
Figure 10B:
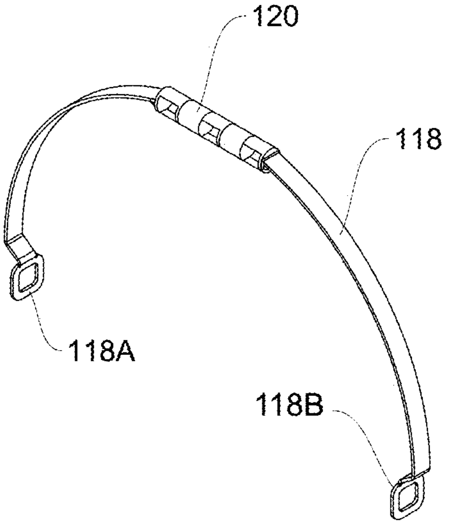
Figure 10C:
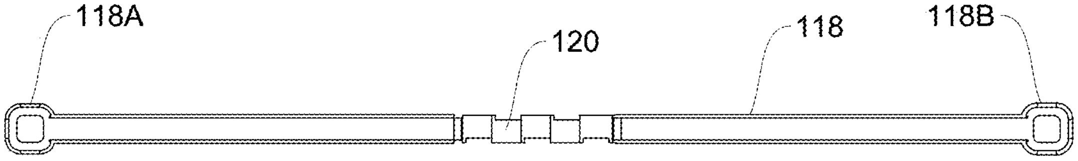

FIGS. 10A-10C illustrates one complete front vertical view of handle 118, one vertical side view of handle 118, one horizontal flat view of handle 118.

A complete assembled nestable plastic can bucket 100 is shown in FIG. 1. The bucket 100 may be any size and various shapes, provided they fit within the geometrical constraints for a tamper evident lid. A flexible plastic lift handle 118 is shown in a front upright position. The lift plastic handle square holes 118A/118B are aligned horizontal with the can bucket support hooks 112/112A. The square support hooks 112/112A, have a front 45-degree angle so that the flexible plastic lift handle square holes 118A/118B provide an easy slip fit over the square support hooks 112/112A, once the flexible plastic lift handle 118 is connected and lowered from its upwards position, the square hole 118/118A changes in position from its straight orientation, and the flexible plastic lift handle will therefrom be connected and cannot be removed. The can bucket 100 has an upper stop ring 114 that stops other can buckets 100A, when nesting, to go too far, and locks against the inside walls of can bucket 100A, as shown in FIGS. 8-8A. FIGS. 8-8A show one horizontal stop ring 114 and a cap 106 with internal threads, including a tamper evident lock ring 108, and a hollow wall 116 at the bottom of can bucket 100.

FIG. 5 shows the can bucket 100. The can bucket 100 has upper external threads 122A and an external stop ring 124 with a male lock 126. When screwing the cover 102 with internal threads 102C clockwise onto the threads 122A of the can bucket 100, the female ratchets locks 102D (shown in FIG. 6B), touch the male lock 126 of the can bucket 100 and immediately the tamper evident lock ring 104 (including the female ratchets locks 102D) starts lifting up, and as soon as the cover 102 has been completely tighten and sealed, the tamper evident lock ring 104 with female ratchets locks 102D lower themselves down to the stop ring 124. The female ratchets locks 102D are therefrom locked over the male lock 126 male lock. The inside threads 102C of cover 102 are aligned when screwing the cover 102 onto the can bucket's threads 122A, so that the threaded neck 102A (including the cap 106) are always facing to the front or the rear of the handle 118. This allows pouring the liquid so it is always away from the side of the handle 118 when unscrewing the cover 102. When starting to turn the cover 102 counterclockwise, all the break-off fingers 130 immediately break off from the tamper evident lock ring 104 and/or from the cover 102. Some break off from the cover 102 or tamper evident lock ring 104, as shown in FIG. 6C.

FIG. 6F shows the cap 106 with an outer tamper evident lock ring 108. When screwing cap 106 with internal threads 110B clockwise onto the threads 102B over the hollow threaded neck 102A, as soon as the female ratchets locks 110A are touching the male lock 102E, the tamper evident lock ring 108 (including the female ratchets locks 110A) immediately starts lifting up. As soon as the cap 106 has been completely tighten, the tamper evident lock ring 108 with the female ratchets locks 110A again lower themselves above the cover 102. The female ratchets locks 110A are then locked over the male lock 102E on top of the cover 102 and male lock 126 of can bucket 100. The inside threads 110B of cap 106 are aligned when screwing the cap 106 onto the threaded hollow neck 102A and threats 102B, so that the threaded neck 102A (including the cap 106) are always facing to the front or the rear of the handle 118. That way, when pouring the liquid, it is always away from the sides of the handle 118. When unscrewing cap 106 and starting to turn the cap 106 counterclockwise, all of the fingers 130 break off from the tamper evident ring 104, and/or from the cover 102. Some break off from the cover 102, and some break off of the tamper evident ring 104.

FIG. 9A provides a complete vertical front view of the top can bucket 100 stacked on top of a bottom can bucket 100A. The first can bucket 100 is placed on top of the lower vertical cover 102A of a second can bucket 100A. FIG. 9A also shows a recessed 360-degree groove floor 110A at the bottom of the can bucket 100. The hollow threaded neck 102B of the second can bucket 100A with the cap 106A are inside the 360-degree groove 110A of the first can bucket 100.

In an exemplary embodiment, a refillable paint can is provided. The refillable paint can includes an inverted frustum conical liquid receptacle 100 defined by a lower floor 113 with sidewalls that taper down from an open upper area to said lower floor 113, external outward threading 122A at an upper outer boundary of said inverted frustum conical liquid receptacle 100, a plurality of male locks 126 disposed below the external outward threading 122A, and a tamper-resistant lid 102.

In some embodiments, the tamper-resistant lid 102 comprises internal threads 102C for engaging with the external outward threading 122A of the inverted frustum conical liquid receptacle 100, a first tamper-evident locking ring 104 with a plurality of internal female ratchet locks 102D, wherein the internal female ratchet locks 102D engage with the male locks 126 of the inverted frustum conical liquid receptacle 100 when the tamper-resistant lid 102 is locked onto the inverted frustum conical liquid receptacle 100, allowing the tamper-resistant lid 102 to be tightened, locked, and sealed, and a plurality of break-off fingers 130 disposed on the tamper-resistant lid 102 between the first tamper-evident locking ring 104 and a top portion of the tamper-resistant lid 102.

In some embodiments, the refillable paint can further comprises a hollow neck 102A extending from the tamper-resistant lid 102, the hollow neck 102A has external threads 102B and a plurality of male locks 102E, a cap 106 having internal threads 111B and a second tamper-evident locking ring 108 with a plurality of internal female ratchet locks 111A, wherein the internal threads 111B of the cap 106 engage with the external threads 102B of the hollow neck 102A and the internal female ratchet locks 111A of the cap 106 engage with the male locks 102E of the hollow neck 102A when the cap 106 is locked onto the hollow neck 102A, allowing the cap 106 to be tightened, locked, and sealed, and a plurality of break-off fingers 128 disposed on the cap 106 between the second tamper-evident locking ring 108 and a top portion of the cap 106, wherein the cap 106 is installed, locked, and sealed onto the tamper-resistant lid 102 by a manufacturer prior to filling the inverted frustum conical liquid receptacle 100.

In some embodiments, the tamper-resistant lid 102 with the locked cap 106 is screwed onto the inverted frustum conical liquid receptacle 100 after filling, activating the first tamper-evident locking ring 104 and sealing the tamper-resistant lid 102 to the inverted frustum conical liquid receptacle 100. Removal of the cap 106 or the tamper-resistant lid 102 causes the respective break-off fingers 128/130 to break off, providing tamper evidence and allowing for easy recycling of the tamper-evident locking rings 104/108.

In some embodiments, the inverted frustum conical liquid receptacle 100, tamper-resistant lid 102, and cap 106 are made of a recyclable plastic material. In some embodiments, the inverted frustum conical liquid receptacle 100 includes a plurality of stacking protrusions on the lower floor, and wherein the tamper-resistant lid 102 includes a plurality of stacking recesses on its top portion, such that the stacking protrusions of one refillable paint can engage with the stacking recesses of another refillable paint can when stacked vertically.

In some embodiments, the hollow neck 102A of the tamper-resistant lid 102 is positioned off-center and oriented towards a front or rear portion of the refillable paint can to facilitate pouring of contents away from a side of the refillable paint can.

In some embodiments, the tamper-resistant lid 102 further comprises a flexible handle 118 hingedly connected to the top portion of the tamper-resistant lid 102, the flexible handle 118 having a pair of locking engagements 118A/118B that engage with a pair of complemental locking engagements 112/112A on the top portion of the tamper-resistant lid 102 to secure the flexible handle 118 in an upright position.

In some embodiments, the flexible handle 118 is made of a resilient material and includes a pair of stop protrusions that engage with a pair of stop recesses on the top portion of the tamper-resistant lid 102 to prevent the flexible handle 118 from rotating beyond the upright position when the locking engagements 118A/118B are engaged with the complemental locking engagements 112/112A.

In an exemplary embodiment, a tamper-resistant closure system for a container comprises a lid having internal threads and a first tamper-evident locking ring 104 with a plurality of internal female ratchet locks 102D, wherein the internal threads of the lid are configured to engage with external threads of the container and the internal female ratchet locks 102D are configured to engage with male locks of the container when the lid is locked onto the container, allowing the lid to be tightened, locked, and sealed, a plurality of break-off fingers 130 disposed on the lid between the first tamper-evident locking ring 104 and a top portion of the lid, a hollow neck 102A extending from the lid, the hollow neck 102A having external threads 102B and a plurality of male locks 102E, a cap 106 having internal threads 111B and a second tamper-evident locking ring 108 with a plurality of internal female ratchet locks 111A, wherein the internal threads 111B of the cap 106 are configured to engage with the external threads 102B of the hollow neck 102A and the internal female ratchet locks 111A of the cap 106 are configured to engage with the male locks 102E of the hollow neck 102A when the cap 106 is locked onto the hollow neck 102A, allowing the cap 106 to be tightened, locked, and sealed, and a plurality of break-off fingers 128 disposed on the cap 106 between the second tamper-evident locking ring 108 and a top portion of the cap 106, wherein the cap 106 is installed, locked, and sealed onto the lid prior to filling the container, and the lid with the locked cap 106 is configured to be secured onto the container after filling, activating the first tamper-evident locking ring 104 and sealing the lid to the container. The removal of the cap 106 or the lid causes the respective break-off fingers 128/130 to break off, providing tamper evidence and allowing for easy recycling of the tamper-evident locking rings 104/108.

While there has been shown and described above the preferred embodiment of the instant invention it is to be appreciated that the invention may be embodied otherwise than is herein specifically shown and described and that certain changes may be made in the form and arrangement of the parts without departing from the underlying ideas or principles of this invention as set forth in the Claims appended herewith.

I claim:

1. A refillable paint can, comprising:

an inverted frustum conical liquid receptacle defined by a lower floor with sidewalls that taper down from an open upper area to said lower floor;

external outward threading at an upper outer boundary of said inverted frustum conical liquid receptacle;

a plurality of male locks disposed below the external outward threading;

a tamper-resistant lid and a hollow neck extending from the lid;

internal threads for engaging with the external outward threading of the inverted frustum conical liquid receptacle;

a first tamper-evident locking ring with a plurality of internal female locks, wherein the internal female locks engage with the male locks of the inverted frustum conical liquid receptacle when the tamper-resistant lid is locked onto the inverted frustum conical liquid receptacle, allowing the tamper-resistant lid to be tightened, locked, and sealed;

a plurality of break-off fingers disposed on the tamper-resistant lid between the first tamper-evident locking ring and a top portion of the tamper-resistant lid;

the hollow neck having external threads and a plurality of male locks;

a cap having internal threads and a second tamper-evident locking ring with a plurality of internal female locks, wherein the internal threads of the cap engage with the external threads of the hollow neck and the internal female locks of the cap engage with the male locks of the hollow neck when the cap is locked onto the hollow neck, allowing the cap to be tightened, locked, and sealed; and a plurality of break-off fingers disposed on the cap between the second tamper-evident locking ring and a top portion of the cap, wherein the cap is installed, locked, and sealed onto the tamper-resistant lid by a manufacturer prior to filling the inverted frustum conical liquid receptacle.

2. The refillable paint can, as recited in claim 1, wherein the tamper-resistant lid with the locked cap is screwed onto the inverted frustum conical liquid receptacle after said filling, activating the first tamper-evident locking ring and sealing the tamper-resistant lid to the inverted frustum conical liquid receptacle; and wherein removal of the cap or the tamper-resistant lid causes the respective break-off fingers to break off, providing tamper evidence and allowing for easy recycling of the tamper-evident locking rings.

3. The refillable paint can, as recited in claim 2, wherein the inverted frustum conical liquid receptacle, tamper-resistant lid, and cap are made of a recyclable plastic material.

4. The refillable paint can, as recited in claim 2, wherein the hollow neck of the tamper-resistant lid is positioned off-center and oriented towards a front or rear portion of the refillable paint can to facilitate pouring of contents away from a side of the refillable paint can.

5. A tamper-resistant closure system for a container, comprising:

a lid having internal threads and a first tamper-evident locking ring with a plurality of internal female locks, wherein the internal threads of the lid are configured to engage with external threads of the container and the internal female locks are configured to engage with male locks of the container when the lid is locked onto the container, allowing the lid to be tightened, locked, and sealed;

a plurality of break-off fingers disposed on the lid between the first tamper-evident locking ring and a top portion of the lid;

a hollow neck extending from the lid, the hollow neck having external threads and a plurality of male locks;

a cap having internal threads and a second tamper-evident locking ring with a plurality of internal female locks, wherein the internal threads of the cap are configured to engage with the external threads of the hollow neck and the internal female locks of the cap are configured to engage with the male locks of the hollow neck when the cap is locked onto the hollow neck, allowing the cap to be tightened, locked, and sealed; and a plurality of break-off fingers disposed on the cap between the second tamper-evident locking ring and a top portion of the cap, wherein the cap is installed, locked, and sealed onto the lid prior to said filling the container, and the lid with the locked cap is configured to be secured onto the container after filling, activating the first tamper-evident locking ring and sealing the lid to the container, and wherein removal of the cap or the lid causes the respective break-off fingers to break off, providing tamper evidence and allowing for easy recycling of the tamper-evident locking rings.

* * * * *